US 6,639,779 B2

(12) United States Patent
Knigge et al.

(10) Patent No.: US 6,639,779 B2
(45) Date of Patent: Oct. 28, 2003

(54) FREQUENCY SELECTIVE TRANSIENT VOLTAGE PROTECTOR

(75) Inventors: Vincent L. Knigge, Lake Zurich, IL (US); Paul F. Haake, Highland Park, IL (US)

(73) Assignee: Oneac Corporation, Libertyville, IL (US)

( * ) Notice: Subject to any disclaimer, the term of this patent is extended or adjusted under 35 U.S.C. 154(b) by 105 days.

(21) Appl. No.: 10/024,793

(22) Filed: Dec. 19, 2001

(65) Prior Publication Data

US 2003/0112575 A1 Jun. 19, 2003

(51) Int. Cl.[7] .................................................. H02H 9/00
(52) U.S. Cl. ......................... 361/119; 361/56; 361/113; 361/127
(58) Field of Search ................... 361/119, 120, 361/56, 58, 113, 127, 91.1

(56) References Cited

U.S. PATENT DOCUMENTS

| 3,864,528 A | * | 2/1975 | Heynen ..................... 375/211 |
| 4,581,493 A | * | 4/1986 | Gazzo et al. ................. 379/12 |
| 4,644,437 A | | 2/1987 | Robe ........................... 361/56 |
| 4,783,713 A | | 11/1988 | Chen ........................... 361/48 |
| 4,943,887 A | | 7/1990 | Bose ........................... 361/56 |
| 5,233,497 A | | 8/1993 | Bremond et al. ............. 361/56 |
| 5,323,461 A | * | 6/1994 | Rosenbaum et al. ... 379/399.01 |
| 5,359,657 A | | 10/1994 | Pelegris ...................... 379/412 |
| 5,490,215 A | | 2/1996 | Pelegris ...................... 379/412 |
| 5,677,820 A | | 10/1997 | Pelegris ...................... 361/119 |
| 5,953,194 A | | 9/1999 | Atkins ......................... 361/119 |
| 6,188,557 B1 | | 2/2001 | Chaudhry ................... 361/111 |
| 6,195,245 B1 | | 2/2001 | Kobsa ......................... 361/120 |
| 6,437,955 B1 | | 8/2002 | Duffy et al. |

FOREIGN PATENT DOCUMENTS

| EP | 0 292 082 | 5/1987 |
| GB | 2 089 173 | 11/1980 |
| GB | 2 258 570 A | 8/1991 |
| WO | WO 98/31084 | 1/1997 |

* cited by examiner

Primary Examiner—Stephen W. Jackson
(74) Attorney, Agent, or Firm—Stroock & Stroock & Lavan LLP

(57) ABSTRACT

A frequency selective transient voltage protector (FSTVP) circuit that may be used in connection with a communication line over which POTS and DSL service may be simultaneously provided. The FSTVP circuit attenuates high frequency transient voltages that exceed a predetermined voltage level, while permitting low frequency, generally high voltage signals (e.g., ring signals) and high frequency, low voltage signals (e.g., DSL signals) to pass with little or no attenuation. The FSTVP circuit comprises a frequency selective network (that comprises a frequency discriminator and a voltage discriminator) connected to an overvoltage protection device that shunts any high frequency transient voltages thus protecting devices connected downstream along the communications line from damage. The frequency selective network is tuned to gate the overvoltage protection device when the frequency and voltage of a signal present on the communication line exceed predetermined values.

46 Claims, 11 Drawing Sheets

FREQUENCY SELECTIVE TRANSIENT VOLTAGE PROTECTOR

BACKGROUND OF THE INVENTION

1. Field of the Invention

This invention is directed to a frequency selective transient voltage protector.

2. Background of the Invention

Telecommunications systems operate over a wide range of signal voltage and frequency. In the United States, for typical communications (telephone) lines, a DC voltage of up to 60 volts is provided to the communications line to power terminal equipment and to act as a carrier for low voltage voice/data signals, and for ring signals. Analog telecommunications voice signals are typically in a frequency band ranging from 300 Hz to 5 KHz and are limited to approximately 5 volts peak. Digital voice signals and DSL (digital subscriber line) signals can have frequency content up to approximately 10 MHz and are also limited to approximately 5 volts peak. During a ringing interval, an AC signal with a frequency between approximately 15 Hz to 70 Hz and with a voltage of up to 150 volts RMS is provided to the communications line. The maximum voltage that can appear on a telephone line from the normal operation of the telecommunications system is 270 volts peak (sum of the peak value of the ring signal and the maximum DC voltage on the line and the peak value of a DSL signal if present).

For long telephone lines in the United States, loop extenders are sometimes employed which increase the DC voltage on the line up to 105 volts. However, lower voltage ring signals are typically used for long telephone lines, so that the peak operating voltage that can appear on the telephone line is still limited to 270 volts peak.

Conventional surge protectors are designed so that they do not operate unless the voltage on the telephone line exceeds the peak operating voltage of the communications system during the ring interval (typically 270 volts in the United States). These conventional surge protectors allow surge voltages up to at least 270 volts to pass through to sensitive low voltage terminal equipment attached to the communications line, when only low voltage signals are expected to be present on the communications line.

Current surge protectors, such as those disclosed in U.S. Pat. Nos. 4,941,063 and 4,758,920 (the '063 and '920 patent, respectively), the entire contents of each of those patents being hereby incorporated by reference, employ "switched filter" technology to overcome many of the shortcomings of conventional surge protectors. Protectors of the type disclosed in the '063 and '920 patents employ a second stage that switches a filter onto the communications line if the voltage on the line changes by a fixed amount (typically 30 volts). Voice or data signals are of too low a voltage to activate the circuit. High voltage ring signals cause the filter to be switched onto the communications line but the filter time constant is chosen to have little effect on low frequency ring signals. Transients, which are comprised of both high voltage and high frequencies, are attenuated by the filter circuit.

Another over-voltage problem on a communications line is caused by lightning. Voltage surges on communications lines that are typically caused by nearby lightning strikes contain energy in the frequency band from DC to greater than 10 MHz, though most of the energy is contained in the frequency band between 25 KHz and 1 MHz.

Referring next to FIG. 1, a prior art voltage protection circuit is depicted and generally designated by reference numeral 100. In operation, when a signal is present on the communications line 10, a voltage is present across the communications line 10 when measured between the Tip and Ring. When the change in voltage across the communications line 10 exceeds the breakdown voltage of CR1 (typically 30 volts), CR1 enters its conductive state (essentially a short circuit) and connects C1 across the communications line 10. That condition preferably occurs when a high voltage transient signal is present on the communications line 10. C1 forms a filter with R1 and R2 and filters the voltage present on the line until the current through CR1 reduces to a value below the holding current rating of CR1. When the current through CR1 reduces to such a value, CR1 returns to its high impedance state (essentially an open circuit) and disconnects capacitor C1 from across the communications line 10. The values of C1, R1 and R2 are chosen to present a high impedance at the frequencies employed for ring signals. Thus, if the voltage change on the line 10 was caused by the presence of a ring signal, the filter has little effect on the ring signal because of its high impedance at the low frequencies used for ring signals.

Transient voltages that may be present on a communications line have significant amounts of energy at frequencies that are considerable higher than the frequencies used for ring signals. In FIG. 1, the impedance of C1 is inversely proportional to frequency. If the voltage change on the line 10 was caused be the presence of a transient voltage (which has a high frequency component), the filter comprised of C1, R1 and R2, has a large effect on the transient voltage because of its low impedance at the high frequencies that are present in transients on communications lines.

However, use of the circuit depicted in FIG. 1 on communications lines that have POTS and DSL service operating simultaneously on the same line, may result in attenuation of a DSL signal. Under those circumstances the voltage change from the ring service of POTS causes the filter to connect across the line. This has little effect on the ring signal, but presents a low impedance to the high frequency DSL signal causing significant attenuation of the DSL signal for the duration of the ringing period.

It is thus desirable to provide a voltage protection circuit that overcomes the above-described shortcomings of the prior art, and that may be used on a telecommunication line over which both POTS and DSL may be present simultaneously.

SUMMARY OF THE INVENTION

In an embodiment of the present invention, the FSTVP circuit comprises a frequency discriminator connected across the communications line, a voltage discriminator connected to the frequency discriminator, and a overvoltage protection device connected to the voltage discriminator. Preferably, the frequency discriminator comprises a capacitor and resistor connected together in series across the communications line or, alternatively, a resistor and inductor connected together in series across the communications line. The voltage discriminator preferably comprises a solid state thyristor-type device, such as a PNPN structure, self-gated triac, or other type of symmetrical transient voltage suppressor device or various other devices that may be combined to achieve the desired voltage discrimination in accordance with the present invention and as described in detail herein. The overvoltage protection device may be any device having at least high impedance and low impedance operating states, and that may be caused to switch between the high and low impedance states (either from high to low, or visa versa) under certain predetermined condition(s). For example, the overvoltage protection device may be a uni- or bi-polar device, a silicon controlled rectifier (SCR), a triac, a p-gate thyristor, a transistor, or other known or hereafter developed device that provides the same or similar functionality to the previously listed devices and as otherwise described herein. The FSTVP circuit of the present invention may also comprise a filtered output and DC overvoltage protection devices to provide shunt paths for low frequency, high voltage transients.

The FSTVP circuit of the present invention thus permits a low frequency signal, such as a ring signal, to pass unattenuated. At the same time, the FSTVP circuit of the present invention permits a high frequency, low voltage signal, such as a DSL signal, to also pass unattenuated. However, the present invention may attenuate (partially or completely) a high frequency, high voltage signal, and a low frequency, high voltage signal such as a transient voltage, so as to prevent damage to service personnel and to devices connected to the communications line protected by the FSTVP circuit.

The FSTVP circuit of the present invention may also be used in connection with other components, circuits and devices. For example, DC overvoltage protection components may be connected to the inventive FSVTP circuit, the output of the FSTVP circuit may be filtered (using a RC or LC circuit), and components may be added to the FSTVP circuit to facilitate the use of uni-polar overvoltage protection devices. The various combinations and embodiments of the present invention will be discussed in more detail below.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
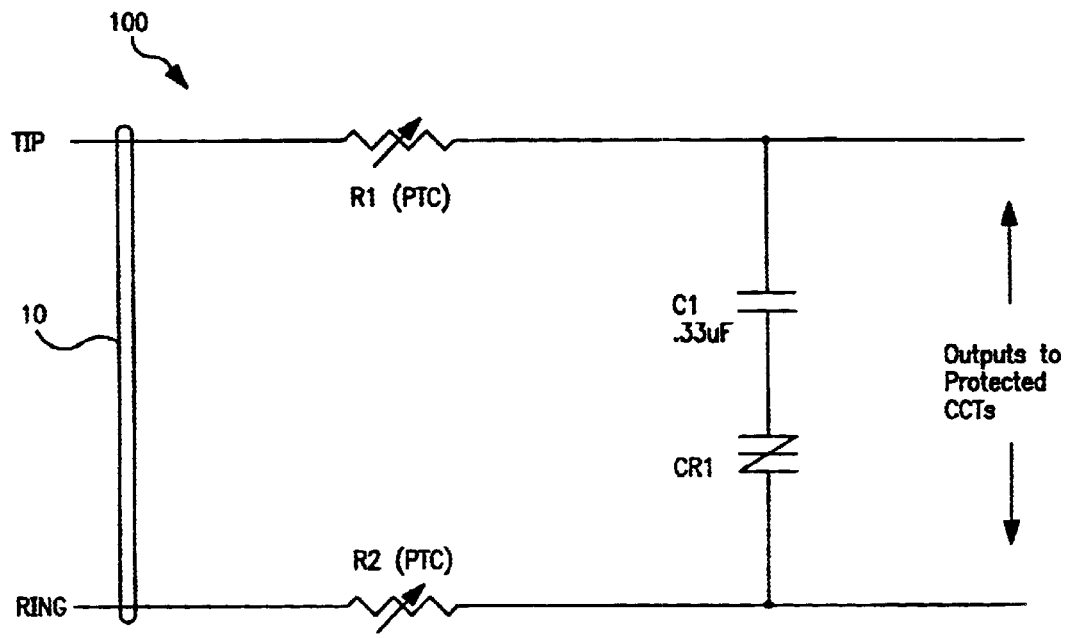
FIG. 1 is a schematic diagram of a prior art frequency selective transient voltage protector.

The present invention is directed to a frequency selective transient voltage protector (FSTVP) circuit that may be used in connection with a communication line over which POTS and DSL service may be simultaneously provided. The FSTVP circuit attenuates high frequency transient voltages that exceed a predetermined voltage level, while permitting low frequency, generally high voltage signals (e.g., ring signals) and high frequency, low voltage signals (e.g., DSL signals) to pass with little or no attenuation. The FSTVP circuit comprises a frequency selective network (that comprises a frequency discriminator and a voltage discriminator) connected to an overvoltage protection device that shunts any high frequency transient voltages thus protecting devices connected along the communications line from damage. The frequency selective network is tuned to gate the overvoltage protection device when the frequency and voltage of a signal present on the communication line exceed predetermined values.

As used herein, the term "communications line" refers to a generally metallic medium (typically, a Tip/Ring twisted-pair copper wire) that interconnects any Central Office or customer premise equipment, including all interconnection points and devices provided along the communication line.

Referring now to the drawings in detail, FIGS. 2A–2D depict embodiments of a FSTVP circuit in accordance with the present invention. Generally designated as 200, the FSTVP circuit is preferably connected across (i.e., in parallel) the two wires of a typical communications line 10 (e.g., a Tip and Ring twisted-pair). The FSTVP circuit 200 comprises a frequency discriminator 210 which may be configured as an RC circuit (see, e.g., FIGS. 2A–2D), or as an R1 circuit (see, e.g., FIG. 2E), a symmetrical transient voltage suppressor 220 which acts as a voltage discriminator, and an overvoltage protection device 230. The symmetrical transient voltage suppressor 220 is connected between the frequency discriminator 210 and overvoltage protection device 230, which are each connected across the communications line 10.

The frequency discriminator 210 preferably comprises a capacitor C1 and a resistor R1 connected together in series. The values of C1 and R1 are selected so that frequency discriminator 210 presents a high impedance to a ring signal, thus causing minimal attenuation of that signal. In addition, the value of C1 is selected so that its impedance is approximately ten times greater that the impedance of R1 at the maximum anticipated frequency of a ring signal (typically, about 70 Hz in the United States). Under those limitations, approximately ten-percent of the voltage of a ring signal appears across R1, and approximately ninety-percent of the voltage of the ring signal appears across C1. That voltage division ensures that a ring signal will not cause the symmetrical transient voltage suppressor 220 to enter a conductive state, as described in more detail below. In the embodiments depicted in FIGS. 2A–2D, C1 is a 0.01 $\mu$F capacitor, and R1 is a 27 K$\Omega$ resistor. Other capacitance and resistance values may be used, provided they satisfy the limitations described herein.

Figure 2A:
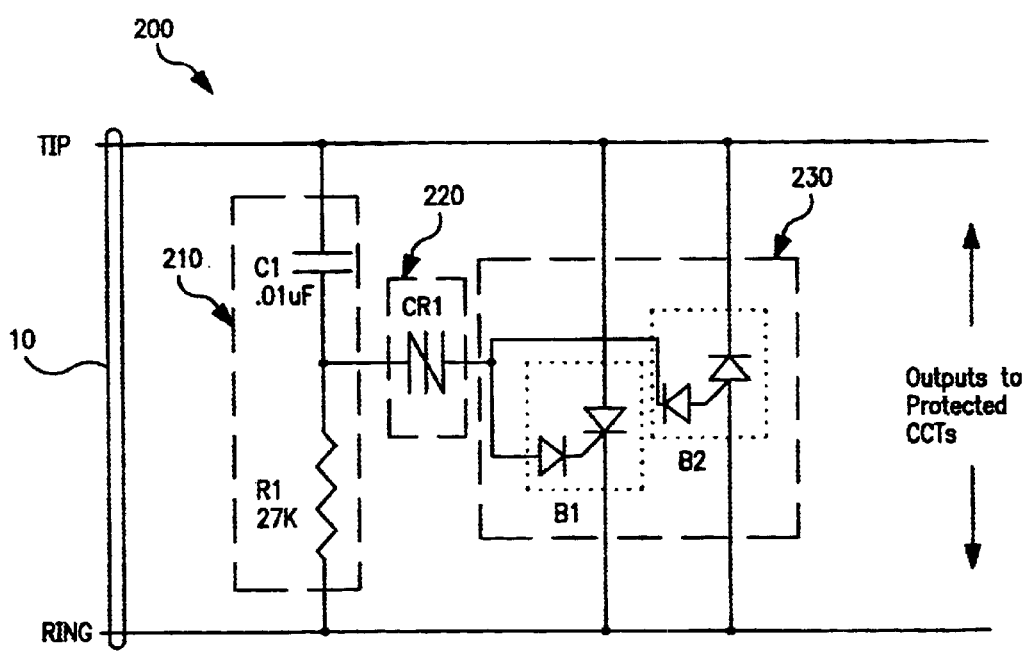
FIGS. 2A–2E are schematic diagrams of a frequency selective transient voltage protector in accordance with embodiments of the present invention.
Figure 2B:
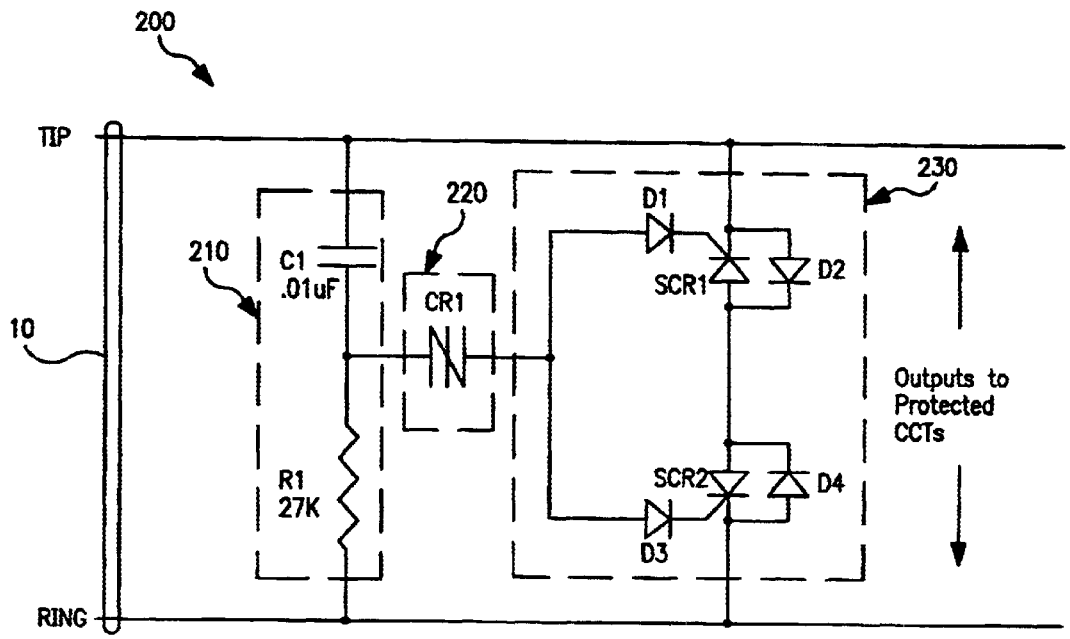
Figure 2C:
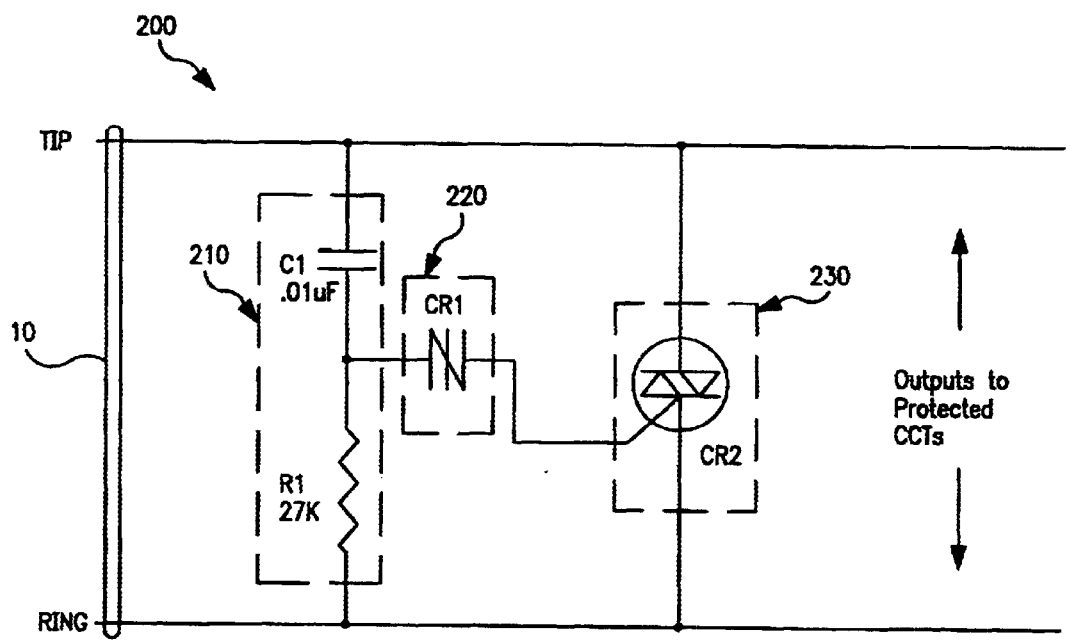
Figure 2D:
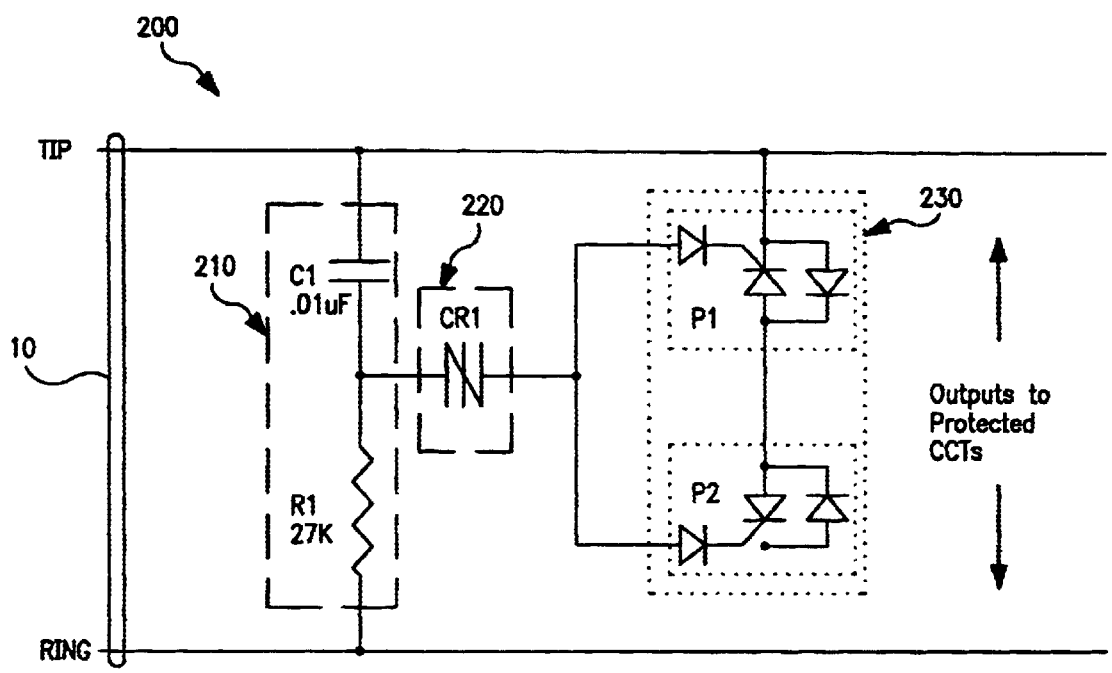
Figure 2E:
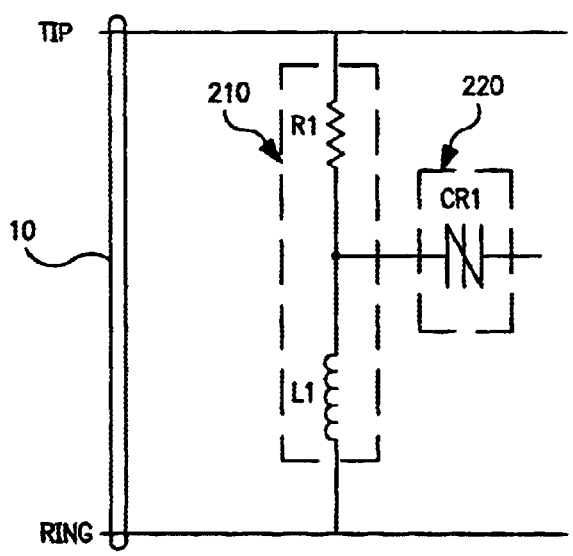

An alternate embodiment of the frequency discriminator 210 is depicted in FIG. 2E, in which an inductor L1 (or other component having an impedance dependent upon frequency) is connected in series with a resistor R1 and across the communications line 10. In that embodiment the values of for R1 and L1 are selected so that frequency discriminator 210 presents a high impedance to a ring signal, thus causing minimal attenuation of that signal. In addition, the value of R1 is selected so that its impedance is approximately ten times greater that the impedance of L1 at the maximum anticipated frequency of a ring signal (typically, about 70 Hz in the United States). Under those limitations, approximately ten-percent of the voltage of a ring signal appears across L1, and approximately ninety-percent of the voltage of the ring signal appears across R1. That voltage division ensures that a ring signal will not cause the symmetrical transient voltage suppressor 220 to enter a conductive state, as described in more detail below. It should be noted that either embodiment of the frequency discriminator 210 may be used in any of the embodiments of the present invention.

The symmetrical transient voltage suppressor 220, also identified as CR1 in FIGS. 2A–2D, is preferably a PNPN-type, solid state thyristor with a breakdown voltage greater than the anticipated peak voltage appearing across R1 when a ring signal is present on the communications line 10; a ring signal typically having a voltage of up to 150V RMS. In a preferred embodiment, the symmetrical transient voltage suppressor 220 has a breakdown voltage ranging from 25 V to 40 V). Thus, when a ring signal is present on the communications line 10, the symmetrical transient voltage suppressor 220 is preferably in a nonconductive state, and the ring signal does not encounter the overvoltage protection device 230, but passes through the FSTVP circuit 200 unattenuated and onto the downstream devices (e.g., telephone, fax, modem, etc.). Even if the voltage of the ring signal peaks, the impedance of the capacitor C1 at the frequency of the ring signal ensures that approximately ninety-percent of the voltage of the ring signal appears across C1, and the voltage presented to the symmetrical transient voltage suppressor 220 (i.e., the voltage across R1) is insufficient to trigger the symmetrical transient voltage suppressor 220.

While the frequency-discriminator 210 presents a high impedance to a low frequency, high voltage (e.g., 150V RMS) ring signal, and thus causes little or no attenuation of that signal, a transient voltage that may occur when voice or data signals are present on the communications line typically has a high frequency component (e.g., greater than 70 Hz). The impedance of the capacitor C1 is inversely proportional to frequency, whereas the impedance of the resistor R1 does not vary with frequency. Thus, as frequency increases, the impedance of the capacitor C1 decreases and the ratio of voltage appearing across the capacitor C1 and resistor R1 changes; less voltage appearing across the capacitor C1 and more voltage appearing across the resistor R1. If a transient voltage is present on the communications line 10 having a relatively high frequency, that transient voltage may have sufficient amplitude to cause the symmetrical transient voltage suppressor 220 to enter a conductive state if the magnitude of the transient voltage exceeds the breakdown voltage of the symmetrical transient voltage suppressor 220. Once the symmetrical transient voltage suppressor 220 is in a conductive state, it gates (i.e., provides a gate current) the overvoltage protection device 230 (depicted as SCR and SCS type devices, each with a diode in series with its gate) into a conductive state. Depending on the polarity of the transient voltage, B1 (positive polarity) or B2 (negative polarity) will be gated and caused to enter a conductive state.

The overvoltage protection device 230 is preferably a thyristor-type device and presents a very low impedance when operating in a gated state, thus effectively short-circuiting the transient voltage for the duration of that voltage. In an embodiment of the present invention depicted in FIG. 2A, the overvoltage protection devices B1 and B2 are each specified for a holding current ($I_H$) of 200 mA, a surge rating ($I_{PP}$) of 100 A, at $10/1000$ $\mu S$.

The FSTVP circuits depicted in FIGS. 2B–2D, generally designated as 200, function in much the same manner as the circuit of FIG. 2A. In FIG. 2B, the overvoltage protection device 230 comprises two silicon-controlled rectifiers (SCR), SCR1 (and D1) and SCR2 (and D3). Each of SCR1 and SCR2 have a diode, D2 and D4, respectively, connected in parallel with the SCR to bypass the SCR for a transient voltage having a predetermined polarity. Thus, for a positive polarity transient, D2 provides a path around SCR1 and the transient signal passes through SCR2. Similarly, for a negative polarity transient, D4 provides a path around SCR2 and the transient signal passes through SCR1. Preferably, each SCR has a holding current ($I_H$) of 200 mA, a surge rating ($I_{PP}$) of 100 A, at $10/1000$ $\mu S$.

In FIG. 2C, the overvoltage protection device 230 comprises a triac with a holding current ($I_H$) of 200 mA, a surge rating ($I_{PP}$) of 100 A, at $10/1000$ $\mu S$. And in FIG. 2D, the overvoltage protection device 230 comprises two forward-conducting p-gate thyristors, each having with a holding current ($I_H$) of 200 mA, a surge rating ($I_{PP}$) of 100 A, at $10/1000$ $\mu S$. Alternatively, various different types of transistors may be used as the overvoltage protection device 230, such as, for example, NPN transistors, PNP transistors, FETs, or MOSFETs. However, use of transistors may require additional circuitry to provide the desired functionality in accordance with the present invention. Unlike thyristors, transistors do not latch into their low impedance "On" state. A separate circuit would have to be added that would keep the transistors in a low impedance state for the duration of the transient.

For any of the embodiments of the present invention described herein, it may be desirable to scale the values of the resistor R1 and capacitor C1 of the frequency discriminator 210. For example, increasing the value of R1 by a factor of ten, and decreasing the value of C1 by a factor of ten, will increase the overall impedance of the frequency discriminator 210 so that less of the signal (either ring or DSL) is diverted through the frequency discriminator 210, thus providing more of the signal at the output of the FSTVP circuit 200. When considering any variation of the values for R1 and C1, the gating current required to cause CR1 to enter a conductive state should also be considered.

Figure 3A:
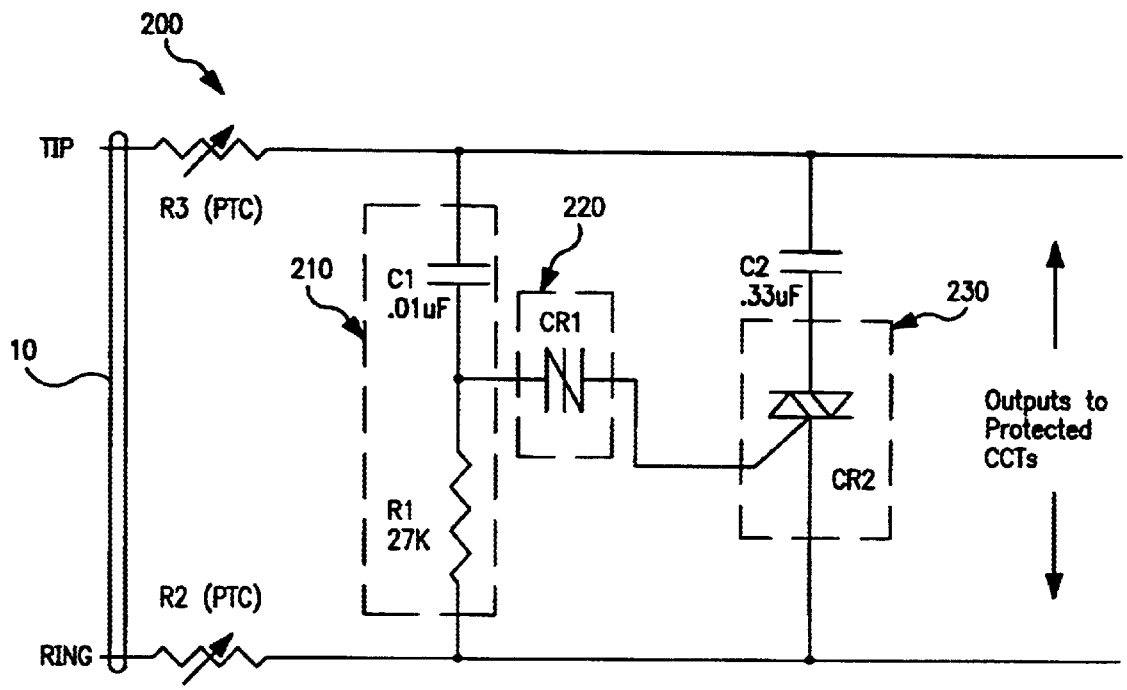
FIGS. 3A–3D are schematic diagrams of a frequency selective transient voltage protector having a filtered output in accordance with embodiments of the present invention.

Referring next to FIGS. 3A–3D, alternative embodiments of a FSTVP circuit 200 in accordance with the present invention are there depicted. In FIG. 3A, the FSTVP circuit 200 is substantially the same as the FSTVP circuit 200 depicted in FIG. 2C, with the exception of capacitor C2 connected in series with the overvoltage protection device 230, and resistors R2 and R3, which are preferably positive temperature coefficient (PTC) type devices. Alternatively, negative temperature coefficient (NTC) type devices may be used. Capacitor C2 and resistors R2 and R3 provide a RC filtered output for the FSTVP circuit 200 that increases the rise time of any transient voltage so as to reduce the magnitude of the voltage appearing at the output of the FSTVP circuit 200. To provide a balanced communications line 10, resistors R2 and R3 are preferably the same value, and preferably are less than 20 Ω to meet the insertion loss requirements of telecommunication systems employed today. However, the values of resistors R2 and R3 cannot be so large as to adversely limit the signal on the communications line 10. Capacitor C2 is preferably 0.33 μF., and as with the resistors R2 and R3, is preferably as large (in terms of capacitance, not physical size) as is, practical without adversely affecting the signals on the communications line 10.

In operation, when the overvoltage protection device 230 in FIGS. 3A–3D is in a conductive state, capacitor C2 is connected across the communications line 10 and forms a filter with resistors R2 and R3 for the remaining duration of the transient voltage. The filter comprised of capacitor C2 and resistors R2 and R3 slows the rise time of the transient voltage and reduces the peak amplitude of the voltage across the communications line 10 due to the transient voltage.

Figure 3B:
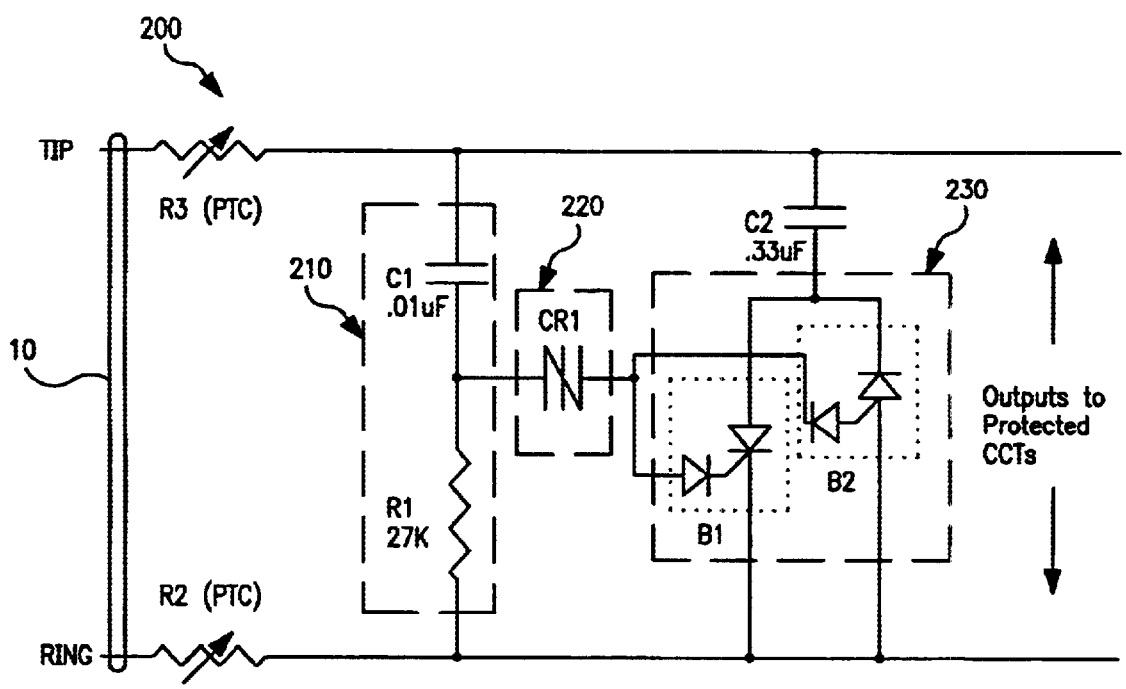

The FSTVP circuit 200 depicted in FIG. 3B is one variation of the embodiment of FIG. 3A, with an alternative type of overvoltage protection device 230. It should be noted that for each FTSVP circuit 200 of the present invention, any type of overvoltage protection device disclosed herein, or having similar functionality, may be used.

Figure 3C:
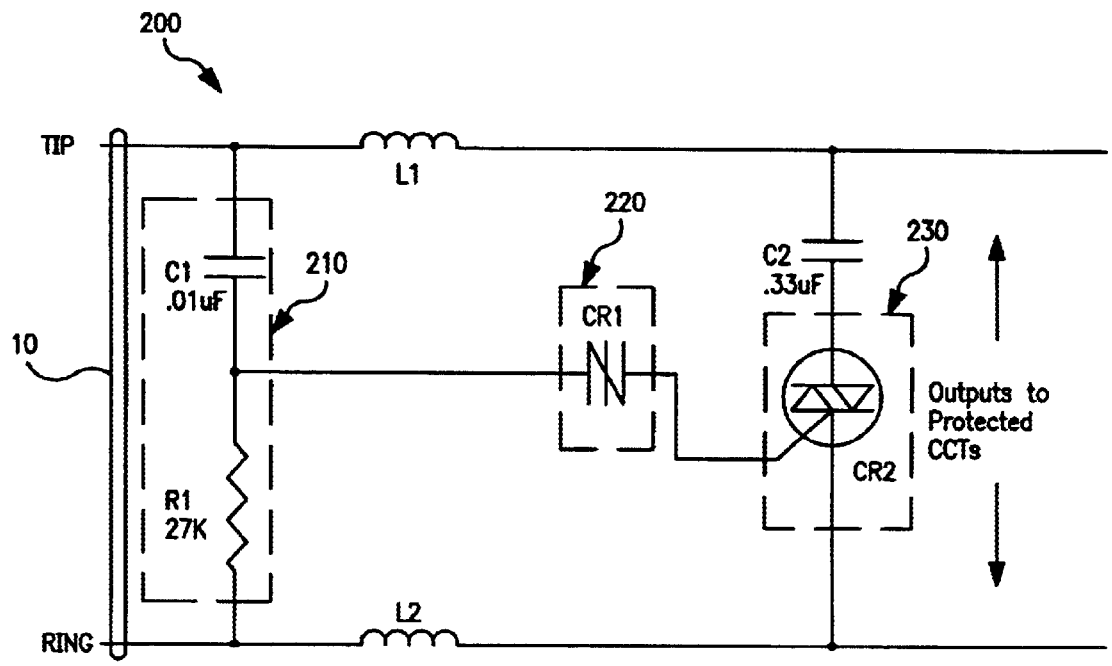
Figure 3D:
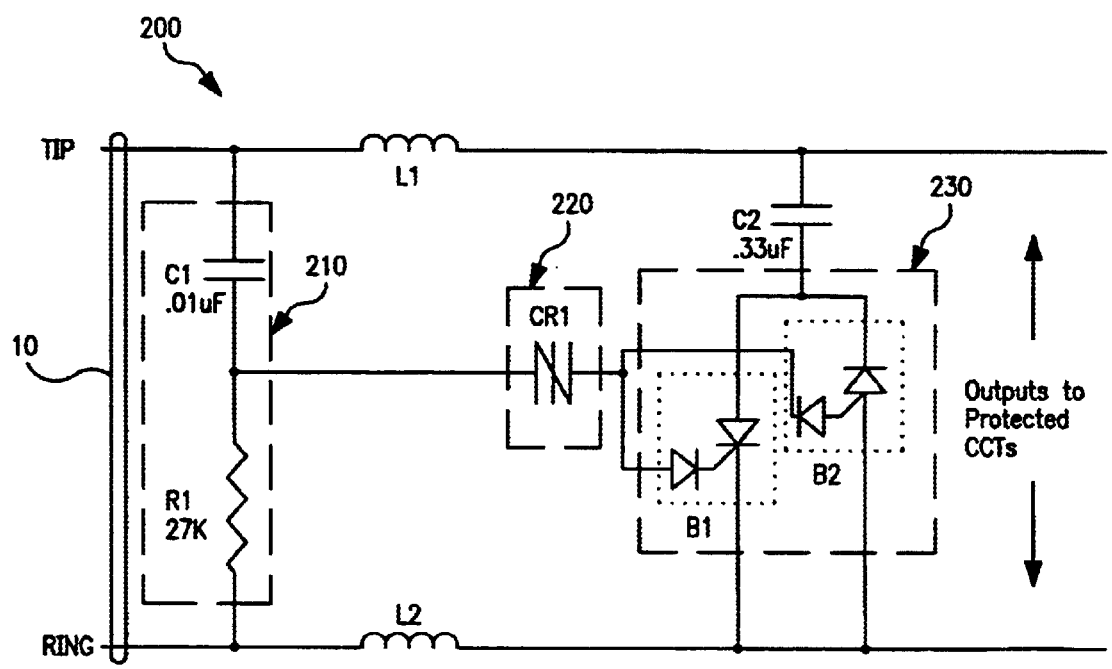

Alternatively, and as depicted in FIGS. 3C and 3D, inductors L1 and L2 may be used together with capacitor C2 to form a filter to reduce the amplitude of the voltage across the communications line 10 due to a transient voltage. For low frequency signals, LC filtering is desirable. For high frequency signals (e.g., DSL), RC filtering is desirable.

Figure 4A:
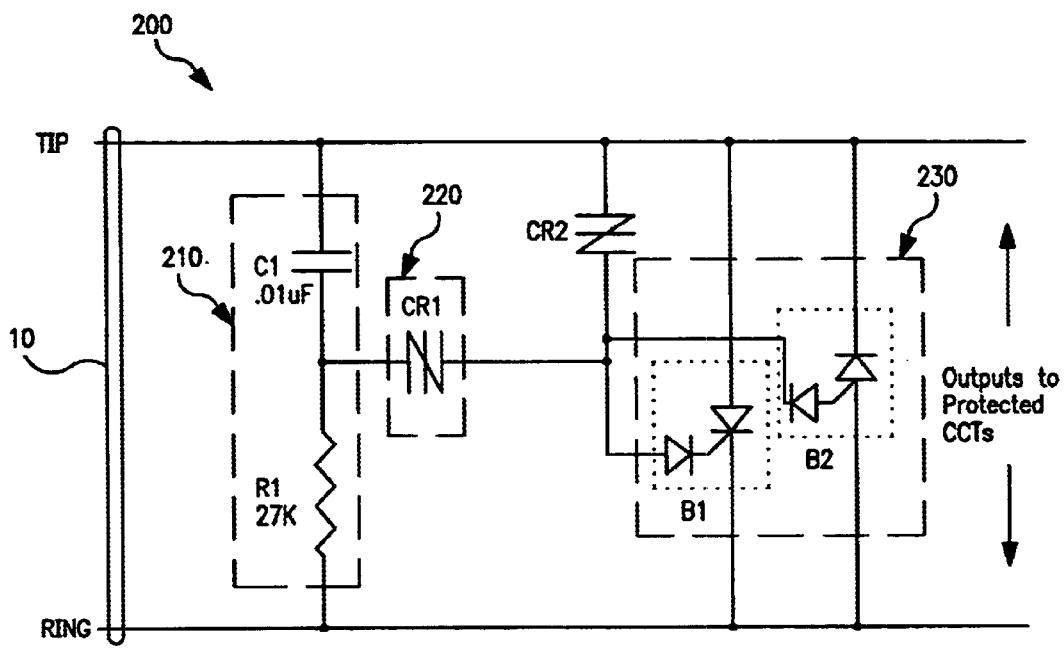
FIGS. 4A–4B are schematic diagrams of a frequency selective transient voltage protector having DC overvoltage protection in accordance with embodiments of the present invention.
Figure 4B:
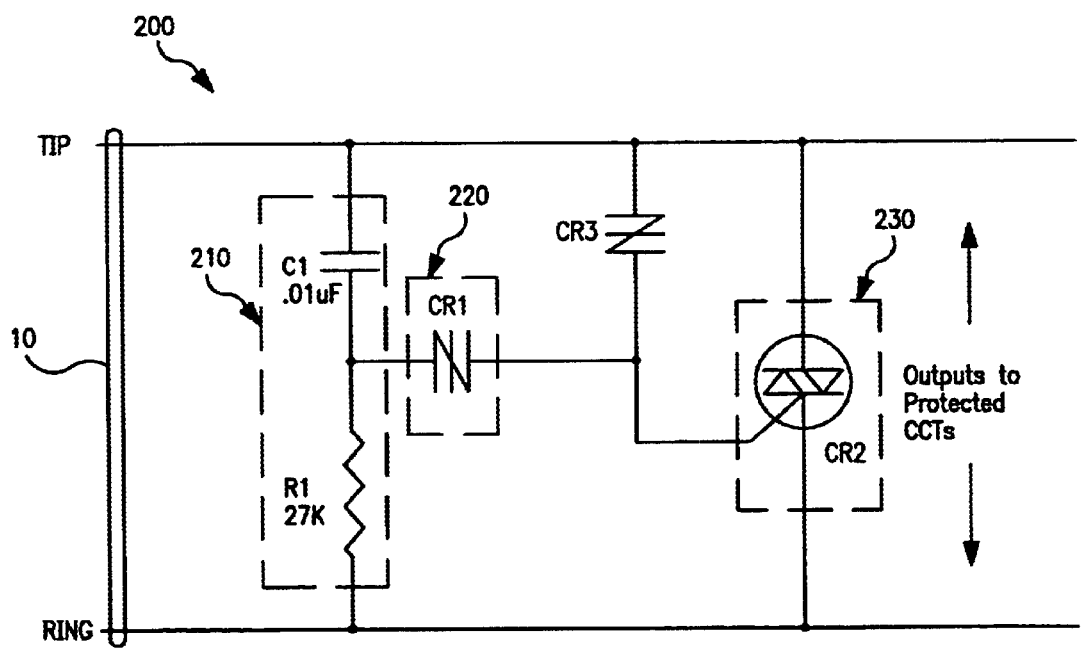

Referring next to FIGS. 4A–4B, alternate embodiments of a FSTVP circuit 200 in accordance with the present invention are depicted and will now be discussed in detail. The FSTVP circuit 200 depicted in FIG. 4A is constructed and operates in substantially the same manner as the FSTVP circuit 200 of FIG. 2A. As discussed above, the FSTVP circuit 200 of FIG. 2A provides for suppression of high frequency transient voltages, but does not directly address low frequency transient voltages. In the FSTVP circuit 200 of FIG. 4A, a second symmetrical transient voltage suppressor (or a zener diode or other similar device), CR2, is connected between the communications line 10 and the input to the overvoltage protection device 230. The breakdown value of CR2 is chosen to be slightly greater than the peak voltage that can appear on the communications line 10 from the communications signals (270 volts for typical POTS lines in the U.S.A.). In the event of a transient voltage on the communications line 10 comprised of only low frequencies (as may result from contact with power mains during service), CR2 enters its conductive state and gates either B1 or B2 (depending upon the polarity of the transient voltage) into a conducive state. Thus, the FSTVP circuit 200 of FIGS. 4A and 4B provide protection to service personnel, for example, against high voltage transients by DC coupling a low frequency, high voltage transient to the overvoltage protection device 230 and away from the output of the FSTVP circuit 200.

Figure 5A:
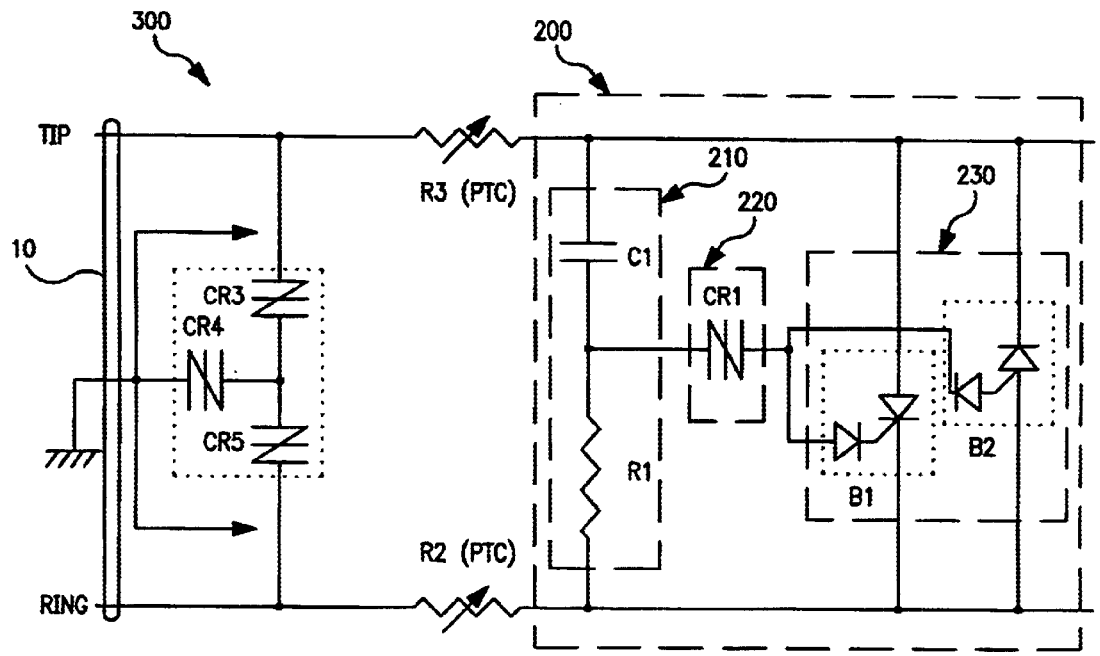
FIGS. 5A–5F are schematic diagrams of a communications line protector circuit including a frequency selective transient voltage protector in accordance with embodiments of the present invention.

Referring next to FIGS. 5A–5F, alternate embodiments of FSTVP circuit 200 in accordance with the present invention are depicted and will now be discussed in detail. In each of those figures, the FSTVP circuit 200 of the present invention is depicted connected to a first stage circuit 300 that provides additional functionality and safeguards to service personnel and devices (e.g., test equipment, end-user equipment (computers, etc.)). For certain applications, it may be desirable to limit the maximum voltage present on the communications line 10, regardless of the frequency of the signal and regardless of whether the voltage is a transient voltage. The first stage 300 and the FSTVP circuit 200 of FIGS. 5A–5F may provide such functionality and protection. In FIG. 5A, the first stage 300 comprises a plurality of symmetrical transient voltage suppressors CR3, CR4 and CR5. The symmetrical transient voltage suppressors CR3, CR4 and CR5 are connected together and across the communications line 10. In addition, resistors R2 and R3 are connected in series between the first stage 300 and the FSTVP circuit 200. Those resistors protect downstream equipment and the FSTVP circuit 200 against over-current conditions. While the FSTVP circuit 200 is connected line-to-line (i.e., between the Tip and Ring of the communications line 10), the first stage 300 of FIG. 5A provides voltage limiting for both line-to-line transients (using CR3 and CR5), and for line-to-earth transients (using CR3, CR4 and CR5).

Figure 5B:
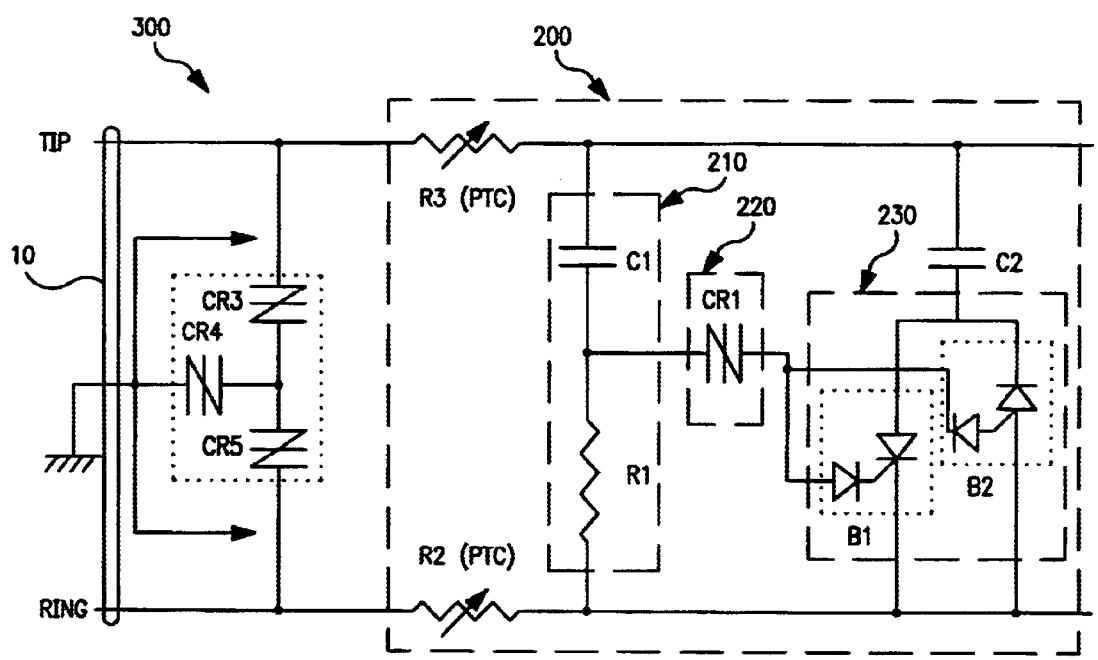

In FIG. 5B, the FSTVP circuit 200 includes a RC filtered output comprised of capacitor C2 and resistors R2 and R3 (see description above for FIGS. 3A and 3B). In addition, a first stage 300 comprised of a plurality of symmetrical transient voltage suppressors, CR3, CR4 and CR5, provides overvoltage protection for line-to-line and line-to-earth transients, as described above for FIG. 5A.

Figure 5C:
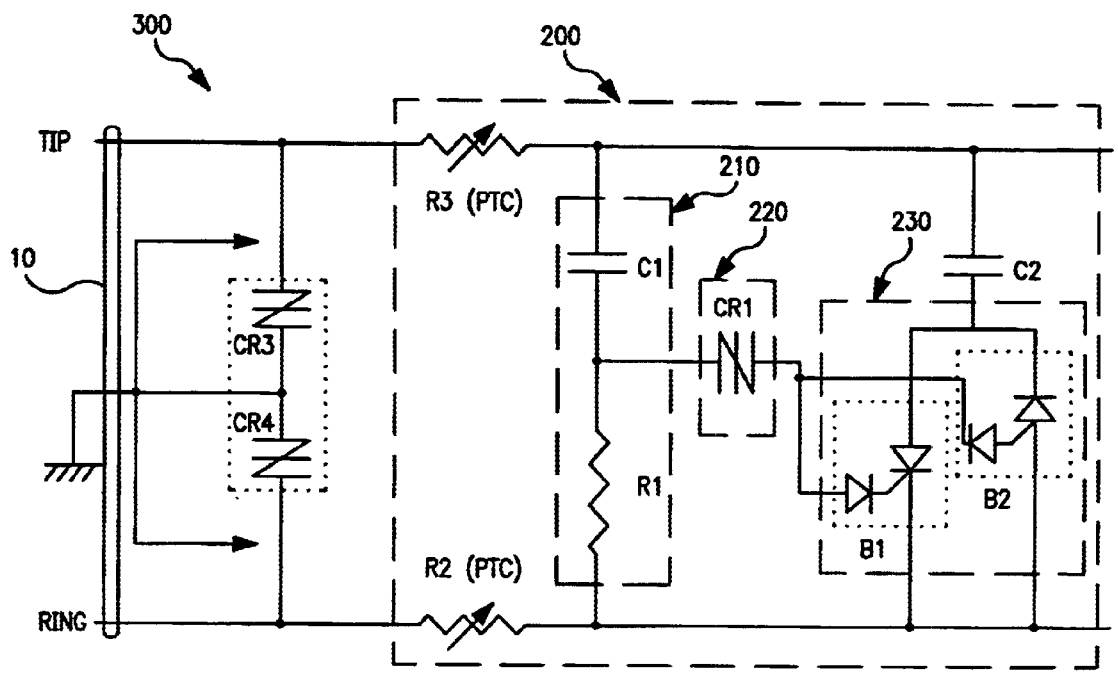
Figure 5D:
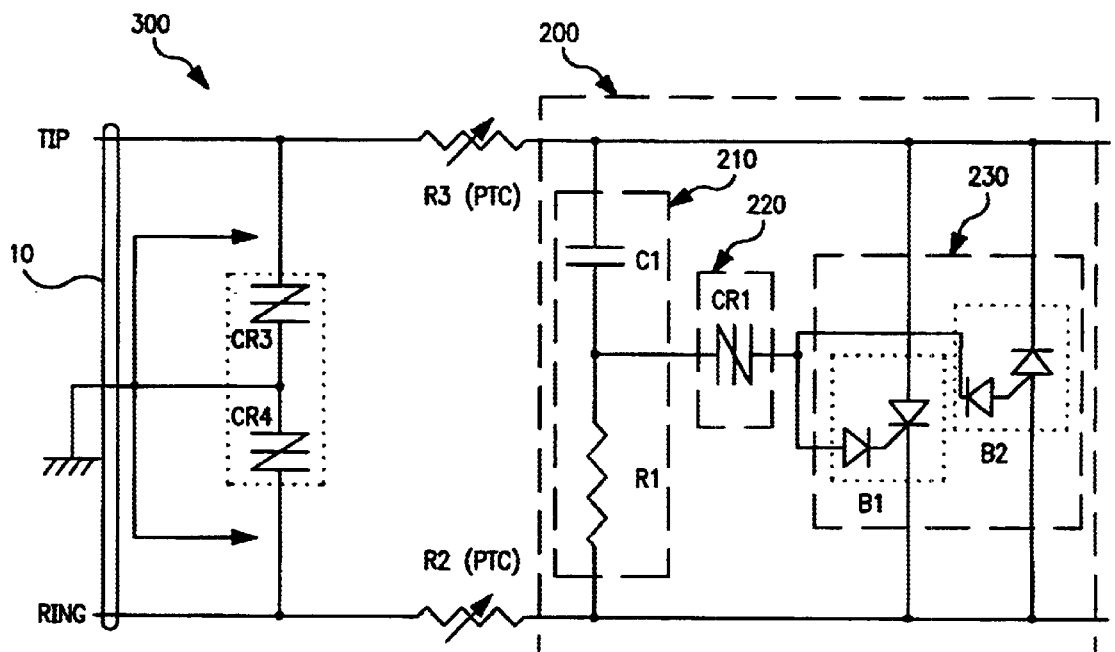

In FIGS. 5C and 5D, the first stage comprises a balanced solid state device having two symmetrical transient voltage suppressors, CR3 and CR4 connected in series with each other and to earth ground, and across the communications line 10. The FSTVP circuit 200 of FIG. 5C includes a RC filtered output, as discussed above with respect to FIG. 5B. In FIG. 5D, the first stage 300 includes resistors R2 and R3 to protect the FSTVP circuit 200 and downstream equipment against over-current conditions. The first stage 300 of FIGS. 5C and 5D provides overvoltage protection for line-to-line and line-to-earth transient voltages present on the communications line 10.

Figure 5E:
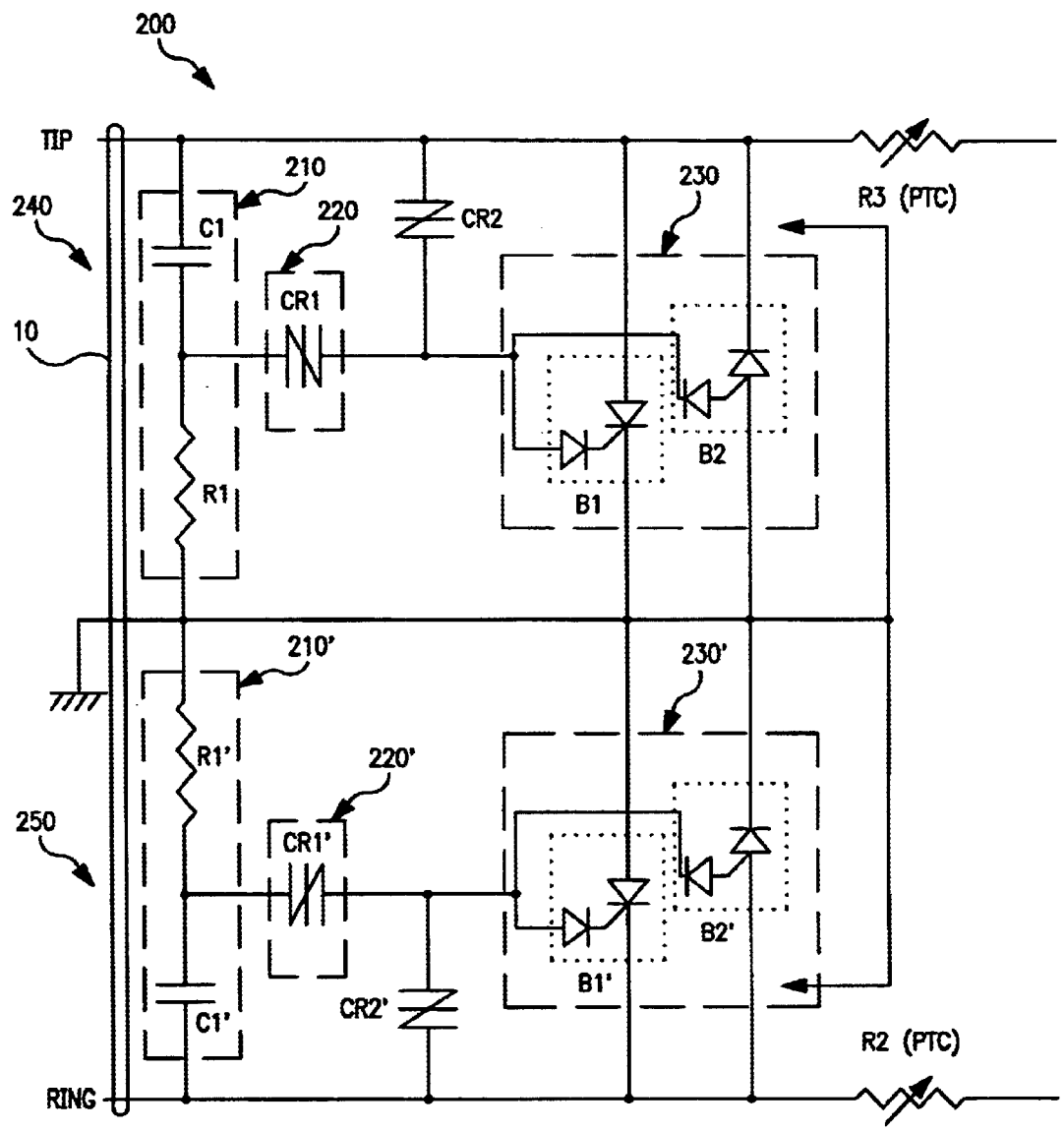

Referring next to FIG. 5E, the FSTVP 200 depicted there comprises a first section 240 connected between Tip and earth ground, and a second section 250 connected between Ring and earth ground. The first and second sections 240, 250 comprise frequency discriminators 210, 210', symmetrical transient voltage suppressors 220, 220', and overvoltage protection devices 230, 230'. In previous embodiments, the FSTVP circuit 200 was connected line-to-line. In FIG. 5E, the first section 240 is connected line (Tip) to earth ground, and the second section 250 is connected line (Ring) to earth ground. The FSTVP circuit 200 of FIG. 5E also comprises symmetrical transient voltage suppressors CR2 and CR2' to provide DC coupling for low frequency, high voltage transients on the communications line 10. In addition, resistors R2 and R3 are optionally provided at the output of the FSTVP circuit 200 to protect down-stream devices against an over-current condition in the FSTVP circuit 200. The various embodiments discussed so far have addressed differential mode transients. However, the present invention may also be used to protect against damage caused by transients on one wire relative to earth ground (common mode transients). By connecting the first section 240 line (Tip) to earth ground and the second section 250 line (Ring) to earth ground, ground referenced transients on either line are handled by the protection circuit connected to that line. Transients that are on one wire relative to the other wire (differential mode transients) are still handled because the first and second sections 240, 250 are effectively in series across the two wires of the communications line.

Figure 5F:
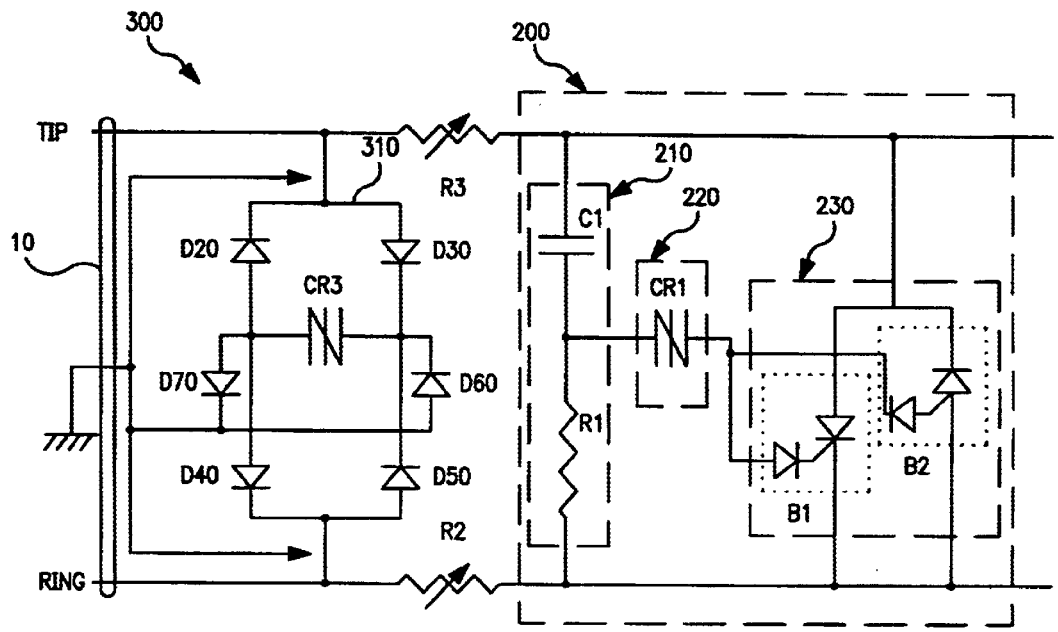

Referring next to FIG. 5F, the first stage 300 comprises a diode bridge 310 comprised of diodes D20, D30, D40, D50, D60 and D70. Symmetrical transient voltage suppressor CR3 is connected to the diode bridge 310 to provide overvoltage protection for low frequency, high voltage transient occurring line-to-line or line-to-earth. For a line-to-line transient, diodes D20–D50 and the symmetrical transient voltage suppressor CR3 provide a path for the transient voltage (the precise path depending on the polarity of the transient voltage). For a line-to earth transient, diodes D30, D50, D70 and CR3 provide a path for the transient voltage (the precise path depending on the polarity of the transient voltage).

It should be noted that any overvoltage protection device 230 disclosed herein may be used for the FSTVP circuits of FIGS. 5A–5F.

Figure 6:
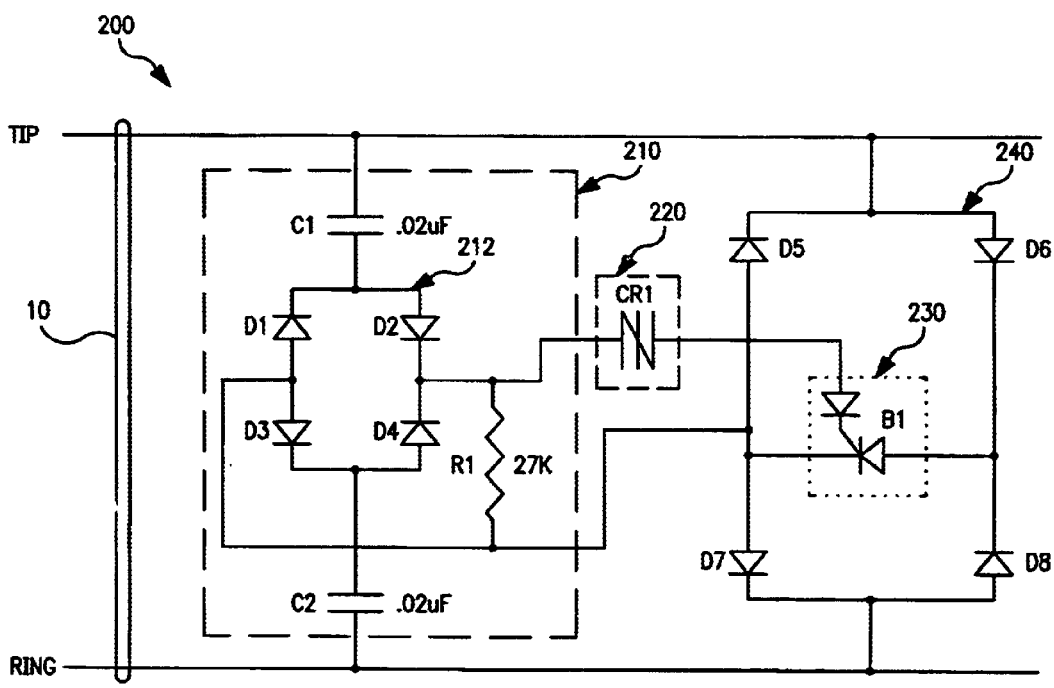
FIG. 6 is a schematic diagram of a line-to-line frequency selective transient voltage protector having a unipolar overvoltage protection device in accordance with an embodiment of the present invention.

Referring next to FIG. 6, another embodiment of a FSTVP circuit 200 in accordance with the present invention is depicted and will now be discussed in detail. In the embodiment of FIG. 6, the frequency discriminator 210 includes resistor R1 connected to capacitor C1 and comprised of diodes D1–D4. The diode bridge 212 ensures that the voltage across R1 is of one polarity (positive or negative depending on the arrangement of the diodes). Those diodes also allow the use a single unipolar overvoltage protection device 230 (CR1) even though signals and transients on the communications line 10 may be of either polarity.

The overvoltage protection device 230 may comprise any device disclosed above, and may be used in connection with a diode bridge 240, comprised of diodes D5–D8, and connected across the communications line 10. The diode bridge 240 ensures that any voltage across the device 230 will be of a single polarity. Diode bridges 212 and 240 enable the use of single, unipolar devices (e.g., CR1 and B1) to protect against high frequency transient voltages on the communications line 10, even though such transient voltages may be of either polarity. The embodiment depicted in FIG. 6 thus provides a balanced, simple, and inexpensive FSTVP circuit 200.

With continued reference to FIG. 6, capacitors C1 and C2 block any DC voltage that may be across the communications line 10 from reaching CR1. This prevents the DC voltage that may be present across the communications line 10 from activating the overvoltage protection device 230 through CR1.

For a signal on the communications line 10 having a predetermined frequency (e.g., greater than 70 Hz) and magnitude, resistor R1 and capacitors C1 and C2 form a frequency selective network, the output of which is connected to CR1. When CR1 is gated or in a conductive state, the overvoltage protection device 230 is also gated or in a conductive state. In that state, each of CR1 and B1 are effective short circuits, thus providing a low impedance path for a desired signal (e.g., a high voltage transient).

The values of resistor R1 and capacitors C1 and C2 are chosen so that the impedance of these three series elements presents a high impedance to a ring signal, thus causing minimal attenuation to the ring signal. Further, the capacitance value of C1 in series with C2 is chosen so as to present an impedance that is approximately ten times the impedance of R1 at the maximum frequency of a ring signal that may be present on a communications line 10. Under those circumstances, approximately ten percent of the voltage of the ring signal appears across resistor R1, and approximately ninety percent appears across capacitors C1 and C2. CR1 is chosen is to have a breakdown value that is slightly higher than the peak value of the voltage that appears across resistor R1 during application of a ring signal at maximum frequency and maximum amplitude. Hence during a ring interval, CR1 and B1 remain in a nonconductive state. Other values of C1, C2, R1 and CR1 may be used provided that the impedance of C1 and C2 is considerable higher than the impedance of R1 at the frequency of the ring signal and the breakdown value of CR1 is adjusted to be slightly greater than the peak value of the voltage that appears across R1 from the application of a ring signal.

Transients that may be present on a communications line 10 have significant amounts of energy at frequencies that are considerable higher than the frequencies used for ring signals. Since the impedance of capacitors C1 and C2 is inversely proportional to frequency, whereas the impedance of the resistor R1 is fixed over frequency, a larger portion of the voltage of the transient appears across R1 than across C1 and C2 as frequency increases. When the voltage across R1 (from a transient, for example) reaches the breakdown value of CR1, CR1 is caused to enter a conductive state and gates B1 into a conductive state. Since B1 is preferably a thyristor-type device, it presents a very low impedance across the communications line 10 while in the conductive state, thus effectively shorting the remaining duration of the transient.

Figure 7:
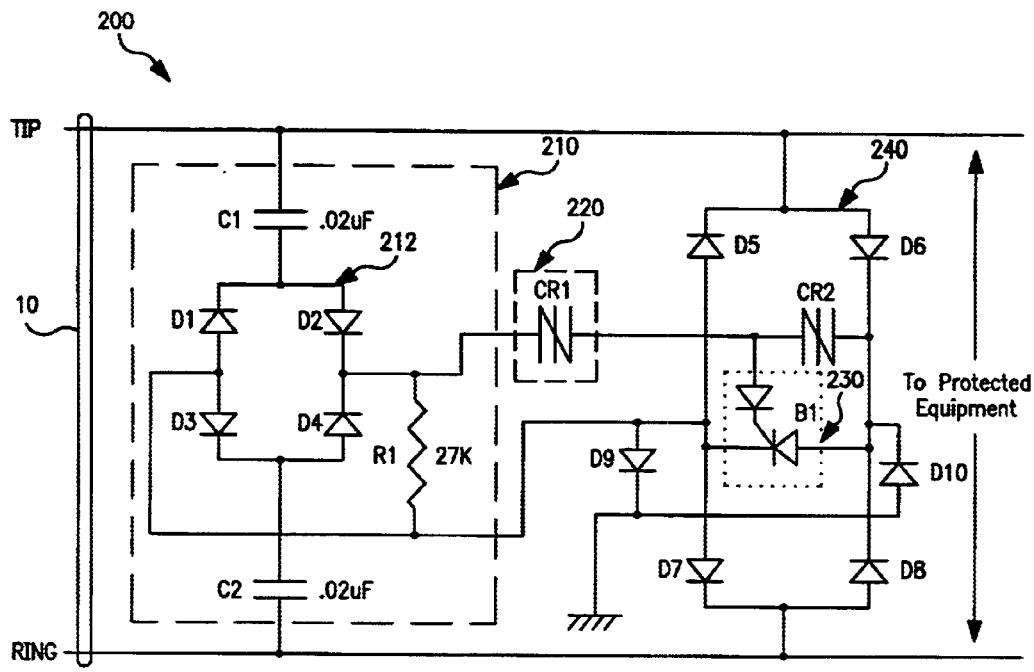
FIG. 7 is a schematic diagram of a line-to-line frequency selective transient voltage protector having a unipolar overvoltage protection device and DC overvoltage protection in accordance with an embodiment of the present invention.

Referring next to FIG. 7, an embodiment of the FSTVP circuit 200 of the present invention is there depicted and will now be discussed in detail. In addition to the diode bridges 212 and 240 discussed above with regard to FIG. 6, the FSTVP circuit 200 of FIG. 7 includes diodes D9 and D10 connected between diode bridge 240 and earth ground. In addition, CR2 is connected between CR1 and diode bridge 240. The breakdown value of CR2 is chosen to be slightly greater than the peak voltage that can appear on the communications line 10 from the communications signals (270 volts for typical POTS lines in the U.S.A.). In the event of transients on the communications line 10 that are comprised of only low frequencies (as would result from contact with power mains, for example) CR2 enters its conductive state and gates B1 into a conductive state, thus providing overvoltage protection for low frequency transients on the communications line 10. The combination of those components, and the components that comprise the FSTVP circuit 200 of the present invention (as previously discussed in detail), provide line-to-line frequency selectivity, and also provide line-to-earth and line-to-line voltage protection.

It can be seen in FIG. 7 that diode bridge 212 is connected across the communications line 10 (i.e., line-to-line). Thus, line-to-line frequency selectivity is provided by the frequency discriminator 210; which, for the embodiment of FIG. 7, is comprised of 0.02 $\mu$F capacitors C1 and C2, and 27 K$\Omega$ resistor R1.

Figure 8:
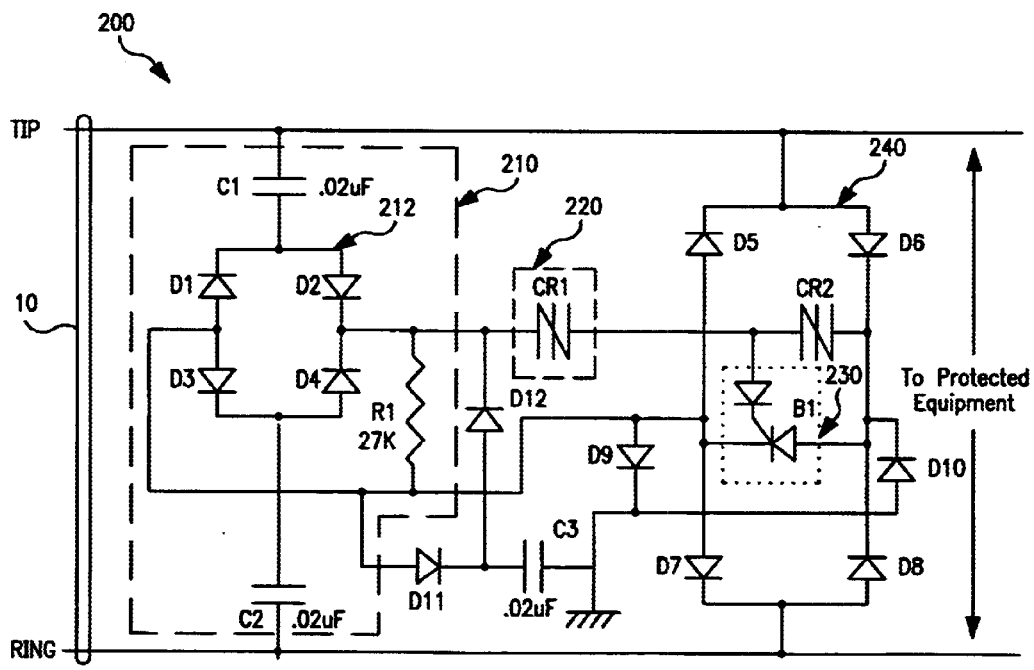
FIG. 8 is a schematic diagram of a line-to-line and line-to-earth frequency selective transient voltage protector having a unipolar overvoltage protection device and DC overvoltage protection in accordance with an embodiment of the present invention.

With reference next to FIG. 8, another embodiment of a FSTVP circuit 200 in accordance with the present invention is there depicted and will now be discussed in detail. In addition to the components discussed above with regard to FIG. 7, the FSTVP circuit of FIG. 8 includes diodes D11 and D12, and 0.02 $\mu$F capacitor C3 to connect the frequency discriminator 210 to earth ground. Any signal or transient across either line (Tip or Ring) of the communications line 10 and earth ground generates a single-polarity voltage across resistor R1 through diodes D11 and D12 and capacitor C3.

It should be noted that for some of the above-described embodiments of the present invention, certain components were the same and thus may not have been discussed in detail for each embodiment. For example, the frequency discriminator 210 for each embodiment comprises at least capacitor C1 and resistor R1. Although the value of capacitor C1 may differ for various embodiments (see, e.g., FIG. 2A and FIG. 8), the functionality of the frequency discriminator 210 as a frequency discriminator is the same for all the embodiments of the present invention. It should also be noted that various substitutions may be made without departing from the spirit or intent of the present invention. In addition, certain embodiments of the FSTVP circuit 200 were depicted and discussed with some of the overvoltage protection device 230 variations. It should be noted that the various overvoltage protection devices discussed herein, as well as other equivalent devices, may be used in any embodiment of the present invention.

It will be obvious to persons skilled in the art from the disclosure provided herein that various manufacturers may provide components having the desired functionality and specifications as described herein, and that such various manufacturer components may be used to construct a FSTVP circuit in accordance with the embodiments of the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A frequency selective transient voltage protector connectable to a two-wire communications line upon which a signal having a voltage and a frequency may be present and comprising:
   a frequency discriminator connectable across the communications line, said frequency discrimination having an output and a voltage at said output related to the frequency and voltage of the signal on the communications line;
   a voltage discriminator connected to said output of said frequency discriminator, said voltage discriminator being in a conductive state and presenting a low impedance to said output of said frequency discriminator when a signal present on the communications line has a frequency equal to or exceeding a predetermined frequency and a voltage equal to or exceeding a first predetermined voltage, said voltage discriminator otherwise being in a nonconductive state and presenting a high impedance to said output of said frequency discriminator; and
   an overvoltage protection device connected to said voltage discriminator and connectable across the communications line, said overvoltage protection device being in a conductive state and presenting a low impedance to the signal present on the communications line when said voltage discriminator is in said conductive state, and being in a nonconductive state and presenting a high impedance to the signal present on the communications line when said voltage discriminator is in said nonconductive state.

2. A frequency selective transient voltage protector as recited by claim 1, wherein said overvoltage protection device comprises one of a bipolar and unipolar device.

3. A frequency selective transient voltage protector as recited by claim 2, wherein said overvoltage protection device comprises one of a PNPN-type thyristor, silicon controlled rectifier, triac, zener diode, and transistor.

4. A frequency selective transient voltage protector as recited by claim 1, wherein said frequency discriminator comprises a resistor connected in series with a device having an impedance dependent upon frequency.

5. A frequency selective transient voltage protector as recited by claim 4, wherein said device comprises one of a capacitor and an inductor.

6. A frequency selective transient voltage protector as recited by claim 4, wherein the signal present on the communications line has a frequency and a voltage, and wherein a first percentage of the voltage of the signal appears across said device when said frequency is below said predetermined frequency, and wherein a second percentage of the voltage of the signal appears across said device when said frequency equals or exceeds said predetermined frequency.

7. A frequency selective transient voltage protector as recited by claim 6, wherein said device is a capacitor and wherein said first percentage is greater than said second percentage.

8. A frequency selective transient voltage protector as recited by claim 6, wherein said device is an inductor and wherein said first percentage is less than said second percentage.

9. A frequency selective transient voltage protector as recited by claim 1, wherein said voltage discriminator is a thyristor-type device.

10. A frequency selective transient voltage protector as recited by claim 1, wherein the signal has a transient high voltage part and wherein said frequency selective transient voltage protector further comprises a filter for filtering the transient high voltage part of the signal when said overvoltage protection device is in said conductive state.

11. A frequency selective transient voltage protector as recited by claim 10, wherein said filter comprises:
    a capacitor connected in series with said overvoltage protection device;
    a first resistor connected in series with one wire of the two-wire communications line; and
    a second resistor connected in series with another wire of the two-wire communications line.

12. A frequency selective transient voltage protector as recited by claim 11, wherein each of said first and said second resistor is one of a positive temperature coefficient resistor and a negative temperature coefficient resistor.

13. A frequency selective transient voltage protector as recited by claim 10, wherein said filter comprises:
    a capacitor connected in series with said overvoltage protection device;
    a first inductor connected in series with one wire of the two-wire communications line; and
    a second inductor connected in series with another wire of the two-wire communications line.

14. A frequency selective transient voltage protector as recited by claim 1, wherein said predetermined frequency range is approximately 70 Hz, and wherein said first predetermined voltage ranges from approximately 25 V to 40 V, inclusive.

15. A frequency selective transient voltage protector as recited by claim 1, further comprising a DC overvoltage protection device connected to a first wire of the two-wire communications line and to said overvoltage protection device and said voltage discriminator, said DC overvoltage protection device being in a conductive state and presenting a low impedance when the signal present on the communications line has a frequency below said predetermined frequency and a voltage equal to or exceeding a second predetermined voltage, said DC overvoltage protection device otherwise being in a nonconductive state and presenting a high impedance to the signal present on the communications line.

16. A frequency selective transient voltage protector as recited by claim 15, wherein said overvoltage protection device comprises one of a PNPN-type thyristor, silicon controlled rectifier, triac, zener diode, and transistor.

17. A frequency selective transient voltage protector connectable to a two-wire communications line upon which a signal having a voltage and a frequency may be present and comprising:

a DC overvoltage protection first stage connected between the two-wire communications line and earth ground; and a second stage connected to said first stage and comprising:

a frequency discriminator connectable across the communications line said frequency discriminator having an output and a voltage at said output related to the frequency and voltage of the signal on the said communications line;

a voltage discriminator connected to said output of said frequency discriminator, said voltage discriminator being in a conductive state and presenting a low impedance to said output of said frequency discriminator when a signal present on the communications line has a frequency equal to or exceeding a predetermined frequency and a voltage equal to or exceeding a first predetermined voltage, said voltage discriminator otherwise being in a nonconductive state and presenting a high impedance to said output of said frequency discriminator; and an overvoltage protection device connected to said voltage discriminator and connectable across the communications line, said overvoltage protection device being in a conductive state and presenting a low impedance to the signal present on the communications line when said voltage discriminator is in said conductive state, and being in a nonconductive state and presenting a high impedance to the signal present on the communications line when said voltage discriminator is in said nonconductive state.

18. A frequency selective transient voltage protector as recited by claim 17, wherein said frequency discriminator comprises a resistor connected in series with a device having an impedance dependent upon frequency.

19. A frequency selective transient voltage protector as recited by claim 18, wherein said device comprises one of a capacitor and an inductor.

20. A frequency selective transient voltage protector as recited by claim 18, wherein the signal present on the communications line has a frequency and a voltage, and wherein a first percentage of the voltage of the signal appears across said device when said frequency is less than said predetermined frequency, and wherein a second percentage of the voltage of the signal appears across said device when said frequency equals or exceeds said predetermined frequency.

21. A frequency selective transient voltage protector as recited by claim 20, wherein said device is a capacitor and wherein said first percentage is greater than said second percentage.

22. A frequency selective transient voltage protector as recited by claim 20, wherein said device is an inductor and wherein said first percentage is less than said second percentage.

23. A frequency selective transient voltage protector as recited by claim 17, wherein said DC overvoltage protection first stage further comprises a first and second resistor connected in series with the communications line and connected between said DC overvoltage protection first stage and said second stage.

24. A frequency selective transient voltage protector as recited by claim 23, wherein said DC overvoltage protection first stage comprises:

a diode bridge connected across the communications line;

a symmetrical transient voltage protector having a first and second terminal and being connected across said diode bridge;

a first diode having one of its anode and cathode connected to one of said first and second terminal of said symmetrical transient voltage protector, said first diode having the other one of its anode and cathode connected to earth ground; and a second diode having one of its anode and cathode connected to another one of said first and second terminal of said symmetrical transient voltage protector, said second diode having the other one of its anode and cathode connected to earth ground.

25. A frequency selective transient voltage protector as recited by claim 17, wherein the signal has a transient high voltage part and wherein said second stage further comprises a filter for filtering the transient high voltage part of the signal when said overvoltage protection device is in said conductive state.

26. A frequency selective transient voltage protector as recited by claim 25, wherein said filter comprises:

a capacitor connected in series with said overvoltage protection device;

a first resistor connected in series with one wire of the two-wire communications line; and a second resistor connected in series with another wire of the two-wire communications line.

27. A frequency selective transient voltage protector as recited by claim 26, wherein each of said first and said second resistor is one of a positive temperature coefficient resistor and a negative temperature coefficient resistor.

28. A frequency selective transient voltage protector connectable to earth ground and to a two-wire communications line upon which a signal having a voltage and a frequency may be present and comprising:

a first frequency discriminator connectable between a first wire of the communications line and earth ground, said first frequency discriminator having an output and a voltage at said output related to the frequency and voltage of the signal on the communications line;

a first voltage discriminator connected to said output of said first frequency discriminator, said first voltage discriminator being in a conductive state and presenting a low impedance to said output of said first frequency discriminator when a signal present on the communications line has a frequency equal to or exceeding a predetermined frequency and a voltage equal to or exceeding a first predetermined voltage, said first voltage discriminator otherwise being in a nonconductive state and presenting a high impedance to said output of said first frequency discriminator;

a first overvoltage protection device connected to said first voltage discriminator and connectable between the first wire of the communications line and earth ground, said first overvoltage protection device being in a conductive state and presenting a low impedance to the signal present on the communications line when said first voltage discriminator is in said conductive state, and being in a nonconductive state and presenting a high impedance to the signal present on the communications line when said first voltage discriminator is in said nonconductive state;

a first DC overvoltage protection device connected to the first wire of the communications line and to said first overvoltage protection device and said first voltage discriminator, said first DC overvoltage protection device being in a conductive state and presenting a low impedance when the signal present on the communications line has a frequency below said predetermined frequency and a voltage equal to or exceeding a second predetermined voltage, said first DC overvoltage protection device otherwise being in a nonconductive state and presenting a high impedance to the signal present on the communications line;

a second frequency discriminator connectable between a second wire of the communications line and earth ground, said second frequency discriminator having an output and a voltage at said output related to the frequency and voltage of the signal on the communications line;

a second voltage discriminator connected to said output of said second frequency discriminator, said second voltage discriminator being in a conductive state and presenting a low impedance to said output of said second frequency discriminator when a signal present on the communications line has a frequency equal to or exceeding said predetermined frequency and a voltage equal to or exceeding said first predetermined voltage, said second voltage discriminator otherwise being in a nonconductive state and presenting a high impedance to said output of said second frequency discriminator;

a second overvoltage protection device connected to said second voltage discriminator and connectable between the second wire of the communications line and earth ground, said second overvoltage protection device being in a conductive state and presenting a low impedance to the signal present on the communications line when said second voltage discriminator is in said conductive state, and being in a nonconductive state and presenting a high impedance to the signal present on the communications line when said second voltage discriminator is in said nonconductive state; and a second DC overvoltage protection device connected to the second wire of the communications line and to said second overvoltage protection device and said second voltage discriminator, said second DC overvoltage protection device being in a conductive state and presenting a low impedance when the signal present on the communications line has a frequency below said predetermined frequency and a voltage equal to or exceeding a second predetermined voltage, said second DC overvoltage protection device otherwise being in a nonconductive state and presenting a high impedance to the signal present on the communications line.

29. A frequency selective transient voltage protector as recited by claim 28, wherein said overvoltage protection device comprises one of a PNPN-type thyristor, silicon controlled rectifier, triac, zener diode, and transistor.

30. A frequency selective transient voltage protector as recited by claim 28, wherein said first frequency discriminator comprises a first resistor connected in series with a first device having an impedance dependent upon frequency, and wherein said second frequency discriminator comprises a second resistor connected in series with a second device having an impedance dependent upon frequency.

31. A frequency selective transient voltage protector as recited by claim 30, wherein said first device comprises one of a first capacitor and a first inductor, and wherein said second device comprises one of a second capacitor and a second inductor.

32. A frequency selective transient voltage protector as recited by claim 30, wherein when a first signal having a first polarity, a frequency, and a voltage is present on the communications line, a first percentage of the voltage of the first signal appears across said first device when the frequency is below said predetermined frequency, and a second percentage of the voltage appears across said first device when said frequency equals or exceeds said predetermined frequency, and wherein when a second signal having a second polarity, a frequency, and a voltage is present on the communications line, is present in the communications line, a first percentage of the voltage of the second signal appears across said second device when the frequency is below said predetermined frequency, and a second percentage of the voltage appears across said second device when said frequency equals or exceeds said predetermined frequency.

33. A frequency selective transient voltage protector as recited by claim 30, wherein each of said first and second devices is a capacitor and wherein for each of said first and second devices, said first percentage is greater than said second percentage.

34. A frequency selective transient voltage protector as recited by claim 30, wherein each of said first and second devices is an inductor and wherein for each of said first and second devices, said first percentage is less than said second percentage.

35. A frequency selective transient voltage protector as recited by claim 28, wherein each of said first and second voltage discriminator is a thyristor-type device.

36. A frequency selective transient voltage protector as recited by claim 28, wherein said overvoltage protection device comprises one of a PNPN-type thyristor, silicon controlled rectifier, triac, zener diode, and transistor.

37. A frequency selective transient voltage protector connectable to a two-wire communications line upon which a signal having a voltage and a frequency may be present and comprising:

a frequency discriminator connectable across the communications line, said frequency discriminator having an output and a voltage at said output related to the frequency and voltage of the signal on the communications line;

a voltage discriminator connected to said output of said frequency discriminator, said voltage discriminator being in a conductive state and presenting a low impedance to said output of said frequency discriminator when a signal present on the communications line has a frequency equal to or exceeding a predetermined frequency and a voltage equal to or exceeding a first predetermined voltage, said voltage discriminator otherwise being in a nonconductive state and presenting a high impedance to said output of said frequency discriminator; and a unipolar overvoltage protection device connected to said voltage discriminator and connectable across the communications line, said unipolar overvoltage protection device being in a conductive state and presenting a low impedance to a signal having a positive or negative polarity present on the communications line when said voltage discriminator is in said conductive state, and being in a nonconductive state and presenting a high impedance to the signal present on the communications line when said voltage discriminator is in said nonconductive state.

38. A frequency selective transient voltage protector as recited by claim 37, wherein said frequency discriminator comprises a first diode bridge having a first terminal and a second terminal, and a filter connected to said first diode bridge and across the communications line.

39. A frequency selective transient voltage protector as recited by claim 38, wherein said filter comprises:
- a first capacitor connected between a first wire of the communications line and said first diode bridge;
- a second capacitor connected between a second wire of the communications line and said first diode bridge; and
- a resistor connected across said first diode bridge.

40. A frequency selective transient voltage protector as recited by claim 38, wherein said unipolar overvoltage protection device comprises:
- a second diode bridge connected across the communications line; and
- one of a PNPN-type thyristor, silicon controlled rectifier, triac, zener diode, and transistor connected across said second diode bridge.

41. A frequency selective transient voltage protector as recited by claim 37, wherein said voltage discriminator comprises a thyristor-type device.

42. A frequency selective transient voltage protector as recited by claim 40, wherein said second diode bridge has a first terminal and a second terminal, and wherein said unipolar overvoltage protection device further comprises:
- a first diode having one of its anode and cathode connected between the first terminal of said second diode bridge and earth ground;
- a second diode having one of its anode and cathode connected between the second terminal of said second diode bridge and earth ground; and
- a thyristor-type device connected between said voltage discriminator and the second terminal of said second diode bridge.

43. A frequency selective transient voltage protector as recited by claim 40, wherein said unipolar overvoltage protection device further comprises:
- a first diode having one of its anode and cathode connected between the first terminal of said second diode bridge and earth ground;
- a second diode having one of its anode and cathode connected between the second terminal of said second diode bridge and earth ground; and
- a thyristor-type device connected between said voltage discriminator and the second terminal of said second diode bridge;

and wherein said frequency selective transient voltage protector further comprises:
- a third diode having one of its anode and cathode connected to the first terminal of said first diode bridge;
- a fourth diode having one of its anode and cathode connected to the second terminal if said first diode bridge having the other one of its anode and cathode connected to earth ground, said third and fourth diodes having the one if their respective anode and cathode connected together; and
- a third capacitor connected between said third and fourth diodes and earth ground.

44. A communications line overvoltage protection circuit connectable to a two-wire communications line upon which a signal having a voltage and a frequency may be present, said circuit comprising:
- means for determining a frequency and voltage of a signal on the communications line; and
- overvoltage protection means, connected to and triggerable by said determining means, for providing a low impedance path for the signal in the communications line when the frequency of the signal is within a frequency range and when the voltage of the signal is within a voltage range.

45. A communications line overvoltage protection circuit as recited by claim 44, wherein said determining means comprises:
- frequency discrimination means connectable across the communications line for determining when a signal present on the communications line has a frequency equal to or exceeding a predetermined frequency, said frequency discrimination means having an output and a voltage at said output related to the frequency and voltage of the signal on the communications line; and
- voltage discrimination means connected to said output of said frequency discrimination means for determining when the signal present on the communications line has a voltage equal to or exceeding a predetermined voltage, said voltage discrimination means being in a conductive state and presenting a low impedance to said output of said frequency discrimination means when the signal present on the communications line has a frequency equal to or exceeding said predetermined frequency and a voltage equal to or exceeding a first predetermined voltage, said voltage discrimination means otherwise being in a nonconductive state and presenting a high impedance to said output of said frequency discrimination means.

46. A communications line overvoltage protection circuit as recited by claim 45, wherein said overvoltage protection means comprises:
- an overvoltage protection device connected to said voltage discrimination means and connectable across the communications line, said overvoltage protection device being in a conductive state and presenting a low impedance to the signal present on the communications line when said voltage discrimination means is in said conductive state, and being in a nonconductive state and presenting a high impedance to the signal present on the communications line when said voltage discrimination means is in said nonconductive state.

* * * * *

UNITED STATES PATENT AND TRADEMARK OFFICE
CERTIFICATE OF CORRECTION

PATENT NO.    : 6,639,779 B2                                          Page 1 of 1
DATED         : October 28, 2003
INVENTOR(S)   : Vincent Knigge et al.

It is certified that error appears in the above-identified patent and that said Letters Patent is hereby corrected as shown below:

Drawings,
Replace Figure 2D with the following substitute Figure 2D:

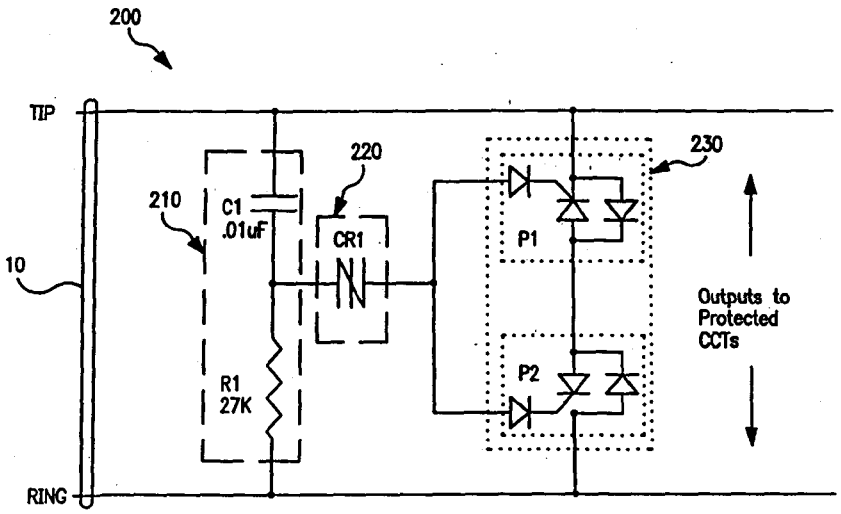

FIG. 2D

Signed and Sealed this

Twenty-seventh Day of January, 2004

JON W. DUDAS
*Acting Director of the United States Patent and Trademark Office*